United States Patent
Cheng et al.

(10) Patent No.: US 9,966,027 B2
(45) Date of Patent: May 8, 2018

(54) ARRAY SUBSTRATE COMBINING PLANE ELECTRIC FIELD AND FRINGE ELECTRIC FIELD, DRIVING METHOD THEREOF AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Mengde Cheng, Beijing (CN); Lisen Wang, Beijing (CN); Sheng Wang, Beijing (CN); Kuhyun Park, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 156 days.

(21) Appl. No.: 15/086,537

(22) Filed: Mar. 31, 2016

(65) Prior Publication Data
US 2016/0300541 A1  Oct. 13, 2016

(30) Foreign Application Priority Data
Apr. 10, 2015 (CN) .......................... 2015 1 0169592

(51) Int. Cl.
*G09G 3/36* (2006.01)
*G02F 1/1343* (2006.01)

(52) U.S. Cl.
CPC ..... *G09G 3/3648* (2013.01); *G02F 1/134309* (2013.01); *G02F 1/134363* (2013.01);
(Continued)

(58) Field of Classification Search
None
See application file for complete search history.

(56) References Cited

U.S. PATENT DOCUMENTS

| 2010/0053484 A1* | 3/2010 | Ono ................. G02F 1/134363 349/37 |
| 2012/0099037 A1* | 4/2012 | Park .................. G02F 1/13624 349/33 |
| 2015/0212372 A1 | 7/2015 | Moon et al. |

FOREIGN PATENT DOCUMENTS

| CN | 1472567 A | 2/2004 |
| CN | 102253551 A | 11/2011 |

(Continued)

OTHER PUBLICATIONS

Office Action dated Mar. 23, 2017 issued in corresponding to Chinese Application No. 201510169592.4.

(Continued)

*Primary Examiner* — Chad Dicke
(74) *Attorney, Agent, or Firm* — Nath, Goldberg & Meyer; Joshua B. Goldberg; Annie J. Kock

(57) ABSTRACT

The present invention provides an array substrate, a driving method thereof, and a display device. The array substrate comprises a plurality of gate lines and a plurality of data lines, and the plurality of gate lines cross with the plurality of data lines to define a plurality of pixel units. Each of the pixel units comprises a first pixel electrode, a second pixel electrode and a floating electrode which are insulated from each other, and the floating electrode is provided in a layer different from that in which the first pixel electrode and the second pixel electrode are provided. The first pixel electrode and the second pixel electrode are capable of forming a plane electric field therebetween, and the floating electrode (Continued)

and both the first pixel electrode and the second pixel electrode are capable of forming a fringe electric field therebetween.

17 Claims, 2 Drawing Sheets

(52) U.S. Cl.
CPC ............ *G02F 2001/134372* (2013.01); *G09G 2300/0434* (2013.01); *G09G 2310/0205* (2013.01)

(56) References Cited

FOREIGN PATENT DOCUMENTS

| | | |
|---|---|---|
| CN | 102414608 A | 4/2012 |
| CN | 102455558 A | 5/2012 |
| CN | 103176317 A | 6/2013 |
| JP | 2003-149664 A | 5/2003 |

OTHER PUBLICATIONS

Second Office Action dated Nov. 10, 2017 in corresponding Chinese Patent Application No. 201510169592.4.

\* cited by examiner

ARRAY SUBSTRATE COMBINING PLANE ELECTRIC FIELD AND FRINGE ELECTRIC FIELD, DRIVING METHOD THEREOF AND DISPLAY DEVICE

CROSS-REFERENCE TO RELATED APPLICATIONS

The present application claims the priority of Chinese Patent Application No. 201510169592.4, filed on Apr. 10, 2015, the contents of which are incorporated herein in their entirety by reference.

FIELD OF THE INVENTION

The present invention relates to the field of display technology, and in particular, relates to an array substrate, a driving method of the array substrate, and a display device.

BACKGROUND OF THE INVENTION

Liquid crystal displays (LCDs) have become mainstream products of existing flat panel displays due to their characteristics of small volume, low power consumption, no radiation, and the like. Liquid crystal molecules in a liquid crystal display can rotate under the effect of an electric field to change an amount of light transmission through a corresponding pixel unit, thereby realizing image display.

Both a traditional in-plane switching (IPS) LCD and a traditional fringe field switching (FFS) LCD have a wide viewing angle, but have a poor light transmission performance. If it is desired that the traditional IPS-LCD and the traditional FFS-LCD have both a wide viewing angle and a high light transmittance, a process resulting in a line width, a cell gap (i.e., a gap in a liquid crystal cell formed by aligning and assembling an array substrate and a color substrate), and the like must have a high accuracy, which makes the process be difficult to be carried out and makes the process result in a low rate of qualified product.

Specifically, in a case of low gray level display, a fringe electric field formed between electrodes of an IPS-LCD is very weak, and only a plane electric field formed therebetween takes effect, which is equivalent to the case that only a plane electric field is formed therebetween. Thus, a light transmittance of the IPS-LCD is affected and very low. However, a fringe electric field of a FFS-LCD is stronger than the plane electric field of the IPS-LCD. Thus, in a case of low gray level display, a light transmittance of the FFS-LCD is higher than that of the IPS-LCD.

In contrast, in a case of high gray level display, a plane electric field formed between electrodes of the FFS-LCD is weak, and only a fringe electric field formed therebetween takes effect, which is equivalent to the case that only the fringe electric field is formed therebetween. Thus, a light transmittance of the FFS-LCD is affected and very low. However, a plane electric field of the IPS-LCD is stronger than the fringe electric field of the FFS-LCD. Thus, in a case of high gray level display, a light transmittance of the IPS-LCD is higher, whereas a light transmittance of the FFS-LCD is lower.

In view of the foregoing, a new display mode, which can meet the requirement of wide viewing angle and significantly increase light transmittances in various display states (e.g., a low gray level display state and a high gray level display state), is urgently needed at present.

SUMMARY OF THE INVENTION

In view of the technical problems existing in the prior art, the present invention provides an array substrate, a driving method of the array substrate, and a display device. The array substrate displays under the joint effect of both a plane electric field and a fringe electric field in various display states, and thus has not only a wide viewing angle but also a high light transmittance.

An array substrate according to the present invention, including a plurality of gate lines and a plurality of data lines, the plurality of gate lines crossing with the plurality of data lines to define a plurality of pixel units, wherein, each of the pixel units includes a first pixel electrode, a second pixel electrode and a floating electrode which are insulated from each other, the floating electrode is provided in a layer different from that in which the first pixel electrode and the second pixel electrode are provided, the first pixel electrode and the second pixel electrode are capable of forming a plane electric field therebetween, and the floating electrode and both the first pixel electrode and the second pixel electrode are capable of forming a fringe electric field therebetween.

Optionally, the first pixel electrode and the second pixel electrode are provided in a same layer, the first pixel electrode includes a plurality of first sub-electrodes which are parallel to each other, provided with a same interval therebetween and of strip shape, the second pixel electrode includes a plurality of second sub-electrodes which are parallel to each other, provided with a same interval therebetween and of strip shape, and the first sub-electrodes and the second sub-electrodes are parallel to each other, arranged alternately with each other and provided with a same interval therebetween.

Optionally, each of the pixel units further includes a first transistor and a second transistor, and the data lines include a first data line and a second data line; and both a gate of the first transistor and a gate of the second transistor are connected to a corresponding gate line, a first electrode of the first transistor is connected to the first data line, a second electrode of the first transistor is connected to the first pixel electrode, a first electrode of the second transistor is connected to the second data line, and a second electrode of the second transistor is connected to the second pixel electrode.

Optionally, each of the pixel units further includes a first transistor and a second transistor, the data lines include a first data line and a second data line, and the gate lines include a first gate line and a second gate line; and a gate of the first transistor is connected to the first gate line, a first electrode of the first transistor is connected to the first data line, a second electrode of the first transistor is connected to the first pixel electrode, a gate of the second transistor is connected to the second gate line, a first electrode of the second transistor is connected to the second data line, and a second electrode of the second transistor is connected to the second pixel electrode.

Optionally, the floating electrode is provided above or under both the first pixel electrode and the second pixel electrode, and an insulating layer is provided between the floating electrode and both the first pixel electrode and the second pixel electrode.

Optionally, the floating electrode is of plate shape, and both the first pixel electrode and the second pixel electrode are provided opposite to the floating electrode.

Optionally, the floating electrode includes a plurality of third sub-electrodes which are parallel to each other, provided with a same interval therebetween and of strip shape, the third sub-electrodes are parallel to both the first sub-electrodes and the second sub-electrodes, and each of the third sub-electrodes corresponds to an interval region between the first sub-electrode and the second sub-electrode which are adjacent to said each of the third sub-electrodes.

Optionally, the floating electrodes in the pixel units are connected to each other, and are input with a same signal.

The present invention further provides a driving method of the array substrate as described above, including steps of: when the array substrate is caused to display information, forming a plane electric field between the first pixel electrode and the second pixel electrode; and forming a fringe electric field between the floating electrode and both the first pixel electrode and the second pixel electrode.

Optionally, the driving method specifically includes steps of: when the array substrate is caused to display information, turning on the first transistor and the second transistor in each of the pixel units at the same time, inputting a first data signal to the first pixel electrode via the first data line, inputting a second data signal to the second pixel electrode via the second data line, and inputting a common voltage signal to the floating electrode.

Optionally, in a case where a gray level to be displayed is less than or equal to 30, a ratio of an intensity of the formed fringe electric field to an intensity of a total electric field ranges from 70% to 90%, and a ratio of an intensity of the formed plane electric field to the intensity of the total electric field ranges from 10% to 30%;

in a case where a gray level to be displayed is greater than 30 and less than 200, a ratio of an intensity of the formed fringe electric field to an intensity of a total electric field ranges from 40% to 60%, and a ratio of an intensity of the formed plane electric field to the intensity of the total electric field ranges from 40% to 60%; and in a case where a gray level to be displayed is greater than 200, a ratio of an intensity of the formed fringe electric field to an intensity of a total electric field ranges from 10% to 30%, and a ratio of an intensity of the formed plane electric field to the intensity of the total electric field ranges from 70% to 90%.

The present invention further provides a display device including the array substrate as described above.

The advantageous technical effects of the present invention are as follows.

By providing a first pixel electrode, a second pixel electrode and a floating electrode in each of pixel units, forming a plane electric field between the first pixel electrode and the second pixel electrode, and forming a fringe electric field between the floating electrode and both the first pixel electrode and the second pixel electrode, each of the pixel units of the array substrate provided by the present invention can display under the joint effect of both the plane electric field and the fringe electric field in various display states (e.g., a low gray level display state and a high gray level display state), and thus the array substrate has not only a wide viewing angle, but also a higher light transmittance than an array substrate in which only a plane electric field or a fringe electric field takes effect in the prior art. Furthermore, as compared with an array substrate in which only a plane electric field or a fringe electric field is formed by arranging electrodes in the prior art, both a plane electric field and a fringe electric field are formed in the array substrate of the present invention. Thus, a process error (e.g., an error of the width of electrodes, an error of an interval between the electrodes, and the like) for arranging electrodes in the present invention has a greatly enhanced fault tolerance, thereby increasing a rate of qualified product under the condition of an existing process.

By employing the array substrate as described above, the display device provided by the present invention has not only a wide viewing angle but also a high light transmittance, thereby improving the display effect thereof.

DETAILED DESCRIPTION OF THE EMBODIMENTS

To make those skilled in the art better understand the technical solutions of the present invention, an array substrate, a driving method of the array substrate, and a display device provided by the present invention will be described below in detail with reference to the accompanying drawings and the following embodiments.

Embodiment 1

Figure 1:
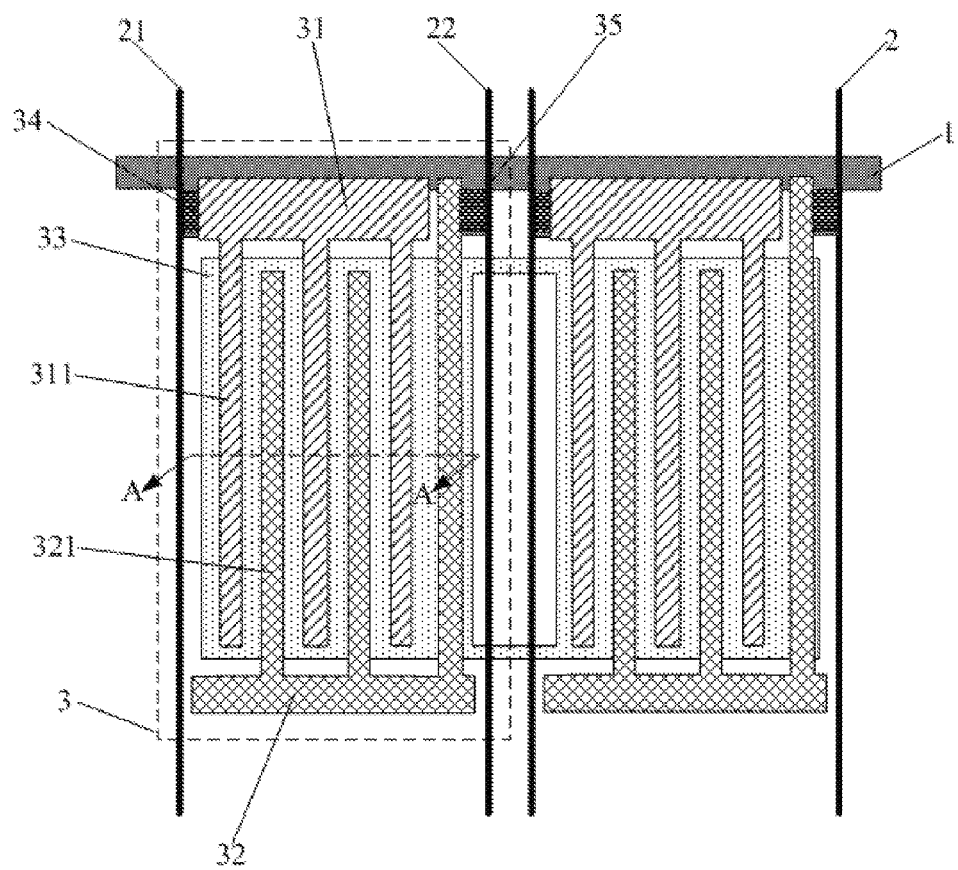
FIG. 1 is a top view of an array substrate provided by embodiment 1 of the present invention.

The present embodiment provides an array substrate. As shown in FIG. 1, the array substrate includes a plurality of gate lines 1 and a plurality of data lines 2, the plurality of gate lines 1 cross with the plurality of data lines 2 to define a plurality of pixel units 3. Each of the pixel units 3 includes a first pixel electrode 31, a second pixel electrode 32 and a floating electrode 33 which are insulated from each other, and the floating electrode 33 is provided in a layer different from that in which the first pixel electrode 31 and the second pixel electrode 32 are provided. The first pixel electrode 31 and the second pixel electrode 32 are capable of forming a plane electric field therebetween, and the floating electrode 33 and both the first pixel electrode 31 and the second pixel electrode 32 are capable of forming a fringe electric field therebetween.

By providing the first pixel electrode 31, the second pixel electrode 32 and the floating electrode 33 in each of pixel units 3, forming the plane electric field between the first pixel electrode 31 and the second pixel electrode 32, and forming the fringe electric field between the floating electrode 33 and both the first pixel electrode 31 and the second pixel electrode 32, each of the pixel units 3 of the array substrate provided by the present embodiment can display under the joint effect of both the plane electric field and the fringe electric field in various display states (e.g., a low gray level display state and a high gray level display state), and thus the array substrate has not only a wide viewing angle, but also a higher light transmittance than an array substrate in which only a plane electric field or a fringe electric field takes effect in the prior art. Furthermore, as compared with an array substrate in which only a plane electric field or a fringe electric field is formed by arranging electrodes in the prior art, both a plane electric field and a fringe electric field are formed in the array substrate of the present embodiment. Thus, a process error (e.g., an error of the width of electrodes, an error of an interval between the electrodes, and the like) for arranging electrodes in the present embodiment has a greatly enhanced fault tolerance, thereby increasing a rate of qualified product under the condition of an existing process.

In the present embodiment, optionally, the first pixel electrode 31 and the second pixel electrode 32 are provided in a same layer, and the first pixel electrode 31 includes a plurality of first sub-electrodes 311 which are parallel to each other, provided with a same interval therebetween and of strip shape. Ends of all the first sub-electrodes 311 are connected together. The second pixel electrode 32 includes a plurality of second sub-electrodes 321 which are parallel to each other, provided with a same interval therebetween and of strip shape. Ends of all the second sub-electrodes 321 are connected together. The first sub-electrodes 311 and the second sub-electrodes 321 are parallel to each other, arranged alternately with each other and provided with a same interval therebetween. With such an arrangement, it can be ensured that a plane electric field with a same amplitude is formed between each first sub-electrode 311 and a second sub-electrode 321 adjacent thereto.

In the present embodiment, each of the pixel units 3 further includes a first transistor 34 and a second transistor 35, and the data lines 2 include a first data line 21 and a second data line 22. Both a gate of the first transistor 34 and a gate of the second transistor 35 are connected to a corresponding gate line 1. A first electrode of the first transistor 34 is connected to the first data line 21, and a second electrode of the first transistor 34 is connected to the first pixel electrode 31. A first electrode of the second transistor 35 is connected to the second data line 22, and a second electrode of the second transistor 35 is connected to the second pixel electrode 32. That is, each of the pixel units 3 corresponds to one gate line 1 and two data lines 2 (i.e., one first data line 21 and one second data line 22). With such an arrangement, when each of the pixel units 3 in the present embodiment is caused to display information, a first data signal can be inputted to the first pixel electrode 31 via the first data line 21, and a second data signal can be inputted to the second pixel electrode 32 via the second data line 22, thereby forming a plane electric field between the first pixel electrode 31 and the second pixel electrode 32.

Figure 2:
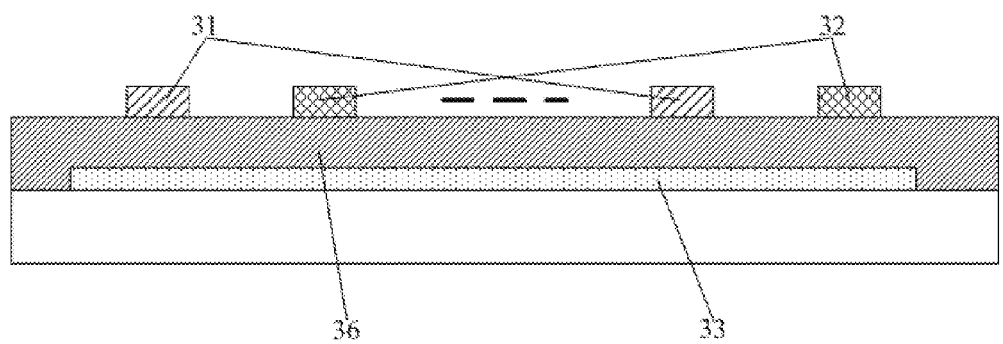
FIG. 2 is a sectional view of the array substrate in FIG. 1 taken along line A-A as shown in FIG. 1.

In the present embodiment, as shown in FIG. 2, the floating electrode 33 is provided under both the first pixel electrode 31 and the second pixel electrode 32, and an insulating layer 36 is provided between the floating electrode 33 and both the first pixel electrode 31 and the second pixel electrode 32. That is, the floating electrode 33 is provided between a substrate (e.g., a glass substrate) and the insulating layer 36.

Specifically, the floating electrode 33 is of plate shape, and both the first pixel electrode 31 and the second pixel electrode 32 are provided opposite to the floating electrode 33. With such an arrangement, not only the floating electrode 33 and both the first pixel electrode 31 and the second pixel electrode 32 can form a fringe electric field therebetween, but also the plane electric field formed between the first pixel electrode 31 and the second pixel electrode 32 and the fringe electric field formed between the floating electrode 33 and both the first pixel electrode 31 and the second pixel electrode 32 together can play a better role of rotating liquid crystal molecules.

It should be noted that, in the present embodiment, the floating electrode 33 may also be provided above both the first pixel electrode 31 and the second pixel electrode 32, as long as the insulating layer 36 is provided between the floating electrode 33 and both the first pixel electrode 31 and the second pixel electrode 32. However, as compared with the foregoing structure (i.e., the structure in which the floating electrode 33 is provided under both the first pixel electrode 31 and the second pixel electrode 32), such a structure (i.e., the structure in which the floating electrode 33 is provided above both the first pixel electrode 31 and the second pixel electrode 32) causes the plane electric field formed between the first pixel electrode 31 and the second pixel electrode 32 to be farther away from liquid crystal molecules. Thus, as compared with the plane electric field formed in the foregoing structure, the plane electric field formed in such a structure has a weaker effect on the liquid crystal molecules.

In the present embodiment, the floating electrodes 33 in the pixel units 3 are connected to each other, and are input with a same signal (e.g., a common voltage signal). Thus, the fringe electric field formed in the pixel units 3 tends to be more stable and balanced.

Based on the above configurations of the array substrate according to the present embodiment, the present embodiment further provides a driving method of the array substrate, including steps of: when the array substrate is caused to display information, forming a plane electric field between the first pixel electrode and the second pixel electrode; and forming a fringe electric field between the floating electrode and both the first pixel electrode and the second pixel electrode.

In the present embodiment, the driving method specifically includes steps of: when the array substrate is caused to display information, turning on the first transistor and the second transistor in each of the pixel units, inputting a first data signal to the first pixel electrode via the first data line, inputting a second data signal to the second pixel electrode via the second data line, and inputting a common voltage signal to the floating electrode. In such a way, when the pixel units are to display information, the first pixel electrode and the second pixel electrode are capable of forming a plane electric field therebetween, meanwhile, the floating electrode and both the first pixel electrode and the second pixel electrode are capable of forming a fringe electric field therebetween. Therefore, the pixel units can display under the joint effect of both the plane electric field and the fringe electric field in various display states, and thus the array substrate has not only a wide viewing angle but also a high light transmittance.

Specifically, in the present embodiment, in a case where a gray level to be displayed is less than or equal to 30, a ratio of an intensity of the formed fringe electric field to an intensity of a total electric field ranges from 70% to 90%, and a ratio of an intensity of the formed plane electric field to the intensity of the total electric field ranges from 10% to 30%. In a case where a gray level to be displayed is greater than 30 and less than 200, a ratio of an intensity of the formed fringe electric field to an intensity of a total electric field ranges from 40% to 60%, and a ratio of an intensity of the formed plane electric field to the intensity of the total electric field ranges from 40% to 60%. In a case where a gray level to be displayed is greater than 200, a ratio of an intensity of the formed fringe electric field to an intensity of a total electric field ranges from 10% to 30%, and a ratio of an intensity of the formed plane electric field to the intensity of the total electric field ranges from 70% to 90%. With such configurations, a combination (i.e., a total electric field) of the plane electric field and the fringe electric field has stronger ability to control liquid crystal molecules, thereby enabling that the array substrate has not only a wide viewing angle but also a high light transmittance in various display states.

Generally, the shade of gray, from full black to full white, of an image displayed by a display device is divided into 256 levels, that is, a gray level ranges from 0 to 255, which is easy to be controlled in a digital driving process. Inventors of the present invention found that, in a case where a gray level to be displayed is less than or equal to 30, a fringe electric field has better ability to control liquid crystal molecules if it dominates. In a case where a gray level to be displayed is greater than 200, a plane electric field has better ability to control liquid crystal molecules if it dominates. In a case where a gray level to be displayed is greater than 30 and less than 200, a combination of the fringe electric field and the plane electric field has better ability to control liquid crystal molecules.

For example, in a case where a common voltage input to the floating electrode is 3V and a gray level to be displayed is 30, the first pixel electrode and the second pixel electrode are provided with the same voltage of 3.26V, as a result, no plane electric field is formed and only a fringe electric field is formed and takes effect, thereby realizing rapid response of rotation of liquid crystal molecules. In a case where a gray level to be displayed is 127 and a voltage applied to the floating electrode is still 3V, the first pixel electrode is provided with a voltage of 4.49V and the second pixel electrode is provided with a voltage of 3.75V. As a result, a plane electric field is formed between the first pixel electrode and the second pixel electrode, and a fringe electric field is formed between the floating electrode and both the first pixel electrode and the second pixel electrode. The plane electric field and the fringe electric field cooperate, and ability of a total electric field to control liquid crystal molecules can be enhanced. In a case where a gray level to be displayed is 220 and a voltage applied to the floating electrode is still 3V, the first pixel electrode is provided with a voltage of 5.58V and the second pixel electrode is provided with a voltage of 0.2V. As a result, a fringe electric field is still formed between the floating electrode and both the first pixel electrode and the second pixel electrode, but a plane electric field formed between the first pixel electrode and the second pixel electrode is stronger. Thus, the plane electric field dominates, and better ability to control liquid crystal molecules can be obtained. Finally, the technical effect that the array substrate has not only a wide viewing angle but also a high light transmittance in various display states is achieved.

Embodiment 2

Figure 3:
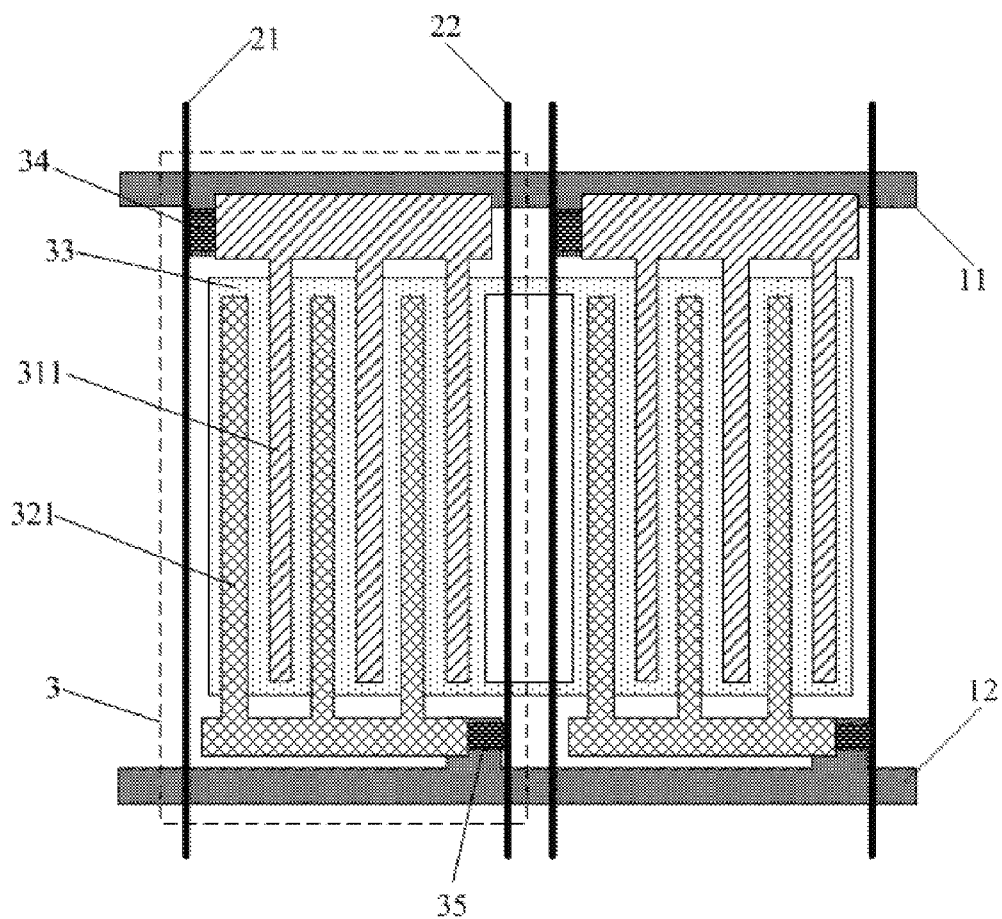
FIG. 3 is a top view of an array substrate provided by embodiment 2 of the present invention.

The present embodiment provides an array substrate. As shown in FIG. 3, this array substrate has similar configurations with those of the array substrate according to embodiment 1. This array substrate differs from the array substrate according to embodiment 1 in that: the gate lines 1 include a first gate line 11 and a second gate line 12, a gate of the first transistor 34 is connected to the first gate line 11, and a gate of the second transistor 35 is connected to the second gate line 12. Of course, as in embodiment 1, in the present embodiment, each of the pixel units 3 includes a first transistor 34 and a second transistor 35, the data lines include a first data line 21 and a second data line 22, a first electrode of the first transistor 34 is connected to the first data line 21, a second electrode of the first transistor 34 is connected to the first pixel electrode 31, a first electrode of the second transistor 35 is connected to the second data line 22, and a second electrode of the second transistor 35 is connected to the second pixel electrode 32.

In the present embodiment, each of the pixel units 3 corresponds to two gate lines (i.e., one first gate line 11 and one second gate line 12) and two data lines 2 (i.e., one first data line 21 and one second data line 22). With such an arrangement, when each of the pixel units 3 in the present embodiment is caused to display information, a first data signal can also be inputted to the first pixel electrode 31 via the first data line 21, and a second data signal can also be inputted to the second pixel electrode 32 via the second data line 22, thereby forming a plane electric field between the first pixel electrode 31 and the second pixel electrode 32.

Other configurations of the array substrate according to the present embodiment are the same as those of the array substrate according to embodiment 1, and detailed description thereof is omitted.

Based on the above configurations of the array substrate according to the present embodiment, a driving method of the array substrate according to the present embodiment includes steps of: when the array substrate is caused to display information, causing the first gate line and the second gate line to scan at the same time to turn on the first transistor and the second transistor in each of the pixel units at the same time, inputting a first data signal to the first pixel electrode via the first data line, inputting a second data signal to the second pixel electrode via the second data line, and inputting a common voltage signal to the floating electrode. In such a way, when each of the pixel units is to display information, a plane electric field is formed between the first pixel electrode and the second pixel electrode, and a fringe electric field is formed between the floating electrode and both the first pixel electrode and the second pixel electrode. As a result, each of the pixel units can display under the joint effect of both the plane electric field and the fringe electric field in various display states, and thus the array substrate has not only a wide viewing angle but also a high light transmittance.

It should be noted that, the first pixel electrode may be controlled separately by the first gate line and the second pixel electrode may be controlled separately by the second gate line, thus, it is possible to control the first pixel electrode only so that a fringe electric field is only formed between the first pixel electrode and the floating electrode, or it is possible to control the second pixel electrode only so that a fringe electric field is only formed between the second pixel electrode and the floating electrode, as necessary. Thus, the formation of a fringe electric field is more flexible and more efficient.

Other steps of the driving method of the array substrate according to the present embodiment are the same as the corresponding steps of the driving method of the array substrate according to embodiment 1, and detailed description thereof is omitted.

Embodiment 3

Figure 4:
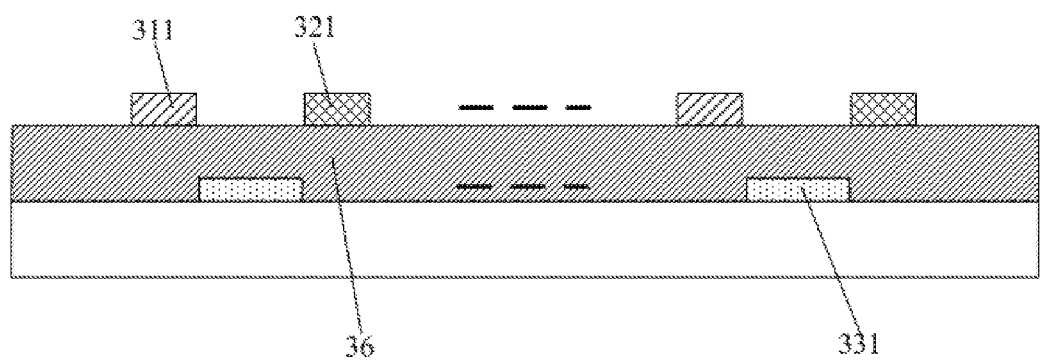
FIG. 4 is a sectional view of an electrode included in an array substrate provided by embodiment 3 of the present invention.

The present embodiment provides an array substrate. As shown in FIG. 4, this array substrate has similar configurations to those of the array substrate according to embodiment 1 or 2, and differs from the array substrate according to embodiment 1 or 2 only in that: the floating electrode 33 includes a plurality of third sub-electrodes 331 which are parallel to each other, provided with a same interval therebetween and of strip shape, the third sub-electrodes 331 are parallel to both the first sub-electrodes 311 and the second sub-electrodes 321, and each of the third sub-electrodes 331 corresponds to an interval region between the first sub-electrode 311 and the second sub-electrode 321 which are adjacent to said each of the third sub-electrodes. In other words, each of the third sub-electrodes 331 corresponds to one first sub-electrode 311 and one second sub-electrode 321.

With such an arrangement, not only the floating electrode and both the first pixel electrode and the second pixel electrode can form a fringe electric field therebetween, but also the plane electric field formed between the first pixel electrode and the second pixel electrode and the fringe electric field formed between the floating electrode and both the first pixel electrode and the second pixel electrode together can play a better role of rotating liquid crystal molecules.

Other configurations of the array substrate and a driving method of the array substrate according to the present embodiment are the same as those of embodiment 1 or 2, and detailed description thereof is omitted.

The advantageous technical effects of embodiments 1 to 3 are as follows. By providing a first pixel electrode, a second pixel electrode and a floating electrode in each of pixel units, forming a plane electric field between the first pixel electrode and the second pixel electrode, and forming a fringe electric field between the floating electrode and both the first pixel electrode and the second pixel electrode, each of the pixel units of the array substrate provided by embodiments 1 to 3 can display under the joint effect of both the plane electric field and the fringe electric field in various display states, and thus the array substrate has not only a wide viewing angle, but also a higher light transmittance than an array substrate in which only a plane electric field or a fringe electric field takes effect in the prior art. Furthermore, as compared with an array substrate in which only a plane electric field or a fringe electric field is formed by arranging electrodes in the prior art, both a plane electric field and a fringe electric field are formed in the array substrate of embodiments 1 to 3. Thus, a process error (e.g., an error of the width of electrodes, an error of an interval between the electrodes, and the like) for arranging electrodes in embodiments 1 to 3 has a greatly enhanced fault tolerance, thereby increasing a rate of qualified product under the condition of an existing process.

Embodiment 4

The present embodiment provides a display device including the array substrate according to any one of embodiments 1 to 3.

By employing the array substrate according to any one of embodiments 1 to 3, the display device has not only a wide viewing angle but also a high light transmittance, thereby improving the display effect thereof.

It should be understood that, the foregoing embodiments are only exemplary embodiments used for explaining the principle of the present invention, but the present invention is not limited thereto. Various variations and improvements may be made by a person skilled in the art without departing from the protection scope of the present invention, and these variations and improvements also fall into the protection scope of the present invention.

What is claimed is:

1. An array substrate, comprising a plurality of gate lines and a plurality of data lines, the plurality of gate lines crossing with the plurality of data lines to define a plurality of pixel units, wherein, each of the pixel units comprises a first pixel electrode, a second pixel electrode and a floating electrode which are insulated from each other, the floating electrode is provided in a layer different from that in which the first pixel electrode and the second pixel electrode are provided, the first pixel electrode and the second pixel electrode are configured to form a plane electric field therebetween, and the floating electrode and both the first pixel electrode and the second pixel electrode are configured to form a fringe electric field therebetween; and the array substrate further comprises a configuration such that, in a case where a gray level to be displayed by the array substrate is less than or equal to 30, a ratio of an intensity of the formed fringe electric field to an intensity of a total electric field ranges from 70% to 90%, and a ratio of an intensity of the formed plane electric field to the intensity of the total electric field ranges from 10% to 30%;

in a case where a gray level to be displayed by the array substrate is greater than 30 and less than 200, a ratio of an intensity of the formed fringe electric field to an intensity of a total electric field ranges from 40% to 60%, and a ratio of an intensity of the formed plane electric field to the intensity of the total electric field ranges from 40% to 60%; and in a case where a gray level to be displayed by the array substrate is greater than 200, a ratio of an intensity of the formed fringe electric field to an intensity of a total electric field ranges from 10% to 30%, and a ratio of an intensity of the formed plane electric field to the intensity of the total electric field ranges from 70% to 90%.

2. The array substrate according to claim 1, wherein, the first pixel electrode and the second pixel electrode are provided in a same layer, the first pixel electrode comprises a plurality of first sub-electrodes which are parallel to each other, provided with a same interval therebetween and of strip shape, the second pixel electrode comprises a plurality of second sub-electrodes which are parallel to each other, provided with a same interval therebetween and of strip shape, and the first sub-electrodes and the second sub-electrodes are parallel to each other, arranged alternately with each other and provided with a same interval therebetween.

3. The array substrate according to claim 2, wherein, each of the pixel units further comprises a first transistor and a second transistor, and the data lines comprise a first data line and a second data line; and both a gate of the first transistor and a gate of the second transistor are connected to a corresponding gate line, a first electrode of the first transistor is connected to the first data line, a second electrode of the first transistor is connected to the first pixel electrode, a first electrode of the second transistor is connected to the second data line, and a second electrode of the second transistor is connected to the second pixel electrode.

4. The array substrate according to claim 2, wherein, each of the pixel units further comprises a first transistor and a second transistor, the data lines comprise a first data line and a second data line, and the gate lines comprise a first gate line and a second gate line; and a gate of the first transistor is connected to the first gate line, a first electrode of the first transistor is connected to the first data line, a second electrode of the first transistor is connected to the first pixel electrode, a gate of the second transistor is connected to the second gate line, a first electrode of the second transistor is connected to the second data line, and a second electrode of the second transistor is connected to the second pixel electrode.

5. The array substrate according to claim 3, wherein, the floating electrode is provided above or under both the first pixel electrode and the second pixel electrode, and an insulating layer is provided between the floating electrode and both the first pixel electrode and the second pixel electrode.

6. The array substrate according to claim 5, wherein, the floating electrode is of plate shape, and both the first pixel electrode and the second pixel electrode are provided opposite to the floating electrode.

7. The array substrate according to claim 6, wherein, the floating electrodes in the pixel units are connected to each other, and are input with a same signal.

8. The array substrate according to claim 5, wherein, the floating electrode comprises a plurality of third sub-electrodes which are parallel to each other, provided with a same interval therebetween and of strip shape, the third sub-electrodes are parallel to both the first sub-electrodes and the second sub-electrodes, and each of the third sub-electrodes corresponds to an interval region between the first sub-electrode and the second sub-electrode which are adjacent to said each of the third sub-electrodes.

9. The array substrate according to claim 8, wherein, the floating electrodes in the pixel units are connected to each other, and are input with a same signal.

10. The array substrate according to claim 4, wherein, the floating electrode is provided above or under both the first pixel electrode and the second pixel electrode, and an insulating layer is provided between the floating electrode and both the first pixel electrode and the second pixel electrode.

11. The array substrate according to claim 10, wherein, the floating electrode is of plate shape, and both the first pixel electrode and the second pixel electrode are provided opposite to the floating electrode.

12. The array substrate according to claim 11, wherein, the floating electrodes in the pixel units are connected to each other, and are input with a same signal.

13. The array substrate according to claim 10, wherein, the floating electrode comprises a plurality of third sub-electrodes which are parallel to each other, provided with a same interval therebetween and of strip shape, the third sub-electrodes are parallel to both the first sub-electrodes and the second sub-electrodes, and each of the third sub-electrodes corresponds to an interval region between the first sub-electrode and the second sub-electrode which are adjacent to said each of the third sub-electrodes.

14. The array substrate according to claim 13, wherein, the floating electrodes in the pixel units are connected to each other, and are input with a same signal.

15. A driving method of the array substrate according to claim 1, comprising steps of:

when the array substrate is caused to display information, forming a plane electric field between the first pixel electrode and the second pixel electrode; and forming a fringe electric field between the floating electrode and both the first pixel electrode and the second pixel electrode.

16. The driving method according to claim 15, wherein, each of the pixel units further comprises a first transistor and a second transistor, and the data lines comprise a first data line and a second data line; and both a gate of the first transistor and a gate of the second transistor are connected to a corresponding gate line, a first electrode of the first transistor is connected to the first data line, a second electrode of the first transistor is connected to the first pixel electrode, a first electrode of the second transistor is connected to the second data line, and a second electrode of the second transistor is connected to the second pixel electrode; or each of the pixel units further comprises a first transistor and a second transistor, the data lines comprise a first data line and a second data line, and the gate lines comprise a first gate line and a second gate line; and a gate of the first transistor is connected to the first gate line, a first electrode of the first transistor is connected to the first data line, a second electrode of the first transistor is connected to the first pixel electrode, a gate of the second transistor is connected to the second gate line, a first electrode of the second transistor is connected to the second data line, and a second electrode of the second transistor is connected to the second pixel electrode;

the driving method specifically comprises steps of: when the array substrate is caused to display information, turning on the first transistor and the second transistor in each of the pixel units at the same time, inputting a first data signal to the first pixel electrode via the first data line, inputting a second data signal to the second pixel electrode via the second data line, and inputting a common voltage signal to the floating electrode.

17. A display device, comprising the array substrate according to claim 1.

* * * * *